US00RE43128E

(19) United States
(12) Reissued Patent
Hethuin et al.

(10) Patent Number: US RE43,128 E
(45) Date of Reissued Patent: Jan. 24, 2012

(54) METHOD FOR TRANSMITTING DATA PACKETS ON CARRIER FREQUENCY WITH LINEAR VARIATION AND TRANSMITTER IMPLEMENTING THIS METHOD

(75) Inventors: Serge Hethuin, Courbevoie (FR); Louis Ramel, Castelnau de Montmirail (FR)

(73) Assignee: Remote Access, LLC, Los Altos, CA (US)

(21) Appl. No.: 11/234,820

(22) Filed: Sep. 23, 2005

Related U.S. Patent Documents

Reissue of:

(64) Patent No.: 6,625,174
Issued: Sep. 23, 2003
Appl. No.: 09/269,745
PCT Filed: Oct. 7, 1996
PCT No.: PCT/FR96/01562
§ 371 (c)(1),
(2), (4) Date: Apr. 6, 1999
PCT Pub. No.: WO98/16043
PCT Pub. Date: Apr. 16, 1998

(30) Foreign Application Priority Data

Jul. 28, 1995 (FR) ..... 95 009227

(51) Int. Cl.
*H04J 1/00* (2006.01)
*H04L 12/56* (2006.01)

(52) U.S. Cl. ..... 370/430; 370/204; 370/208; 370/419; 370/481; 370/484

(58) Field of Classification Search ..... 370/419, 370/430, 204, 208, 481, 484
See application file for complete search history.

(56) References Cited

U.S. PATENT DOCUMENTS

| | | | |
|---|---|---|---|
| 4,553,213 | A | 11/1985 | Hyatt |
| 4,636,958 | A | 1/1987 | Hethuin et al. |
| 4,728,957 | A | 3/1988 | Hethuin |
| 4,766,436 | A | 8/1988 | Crepin et al. |
| 4,947,354 | A | 8/1990 | Hethuin |
| 5,032,840 | A | 7/1991 | Hethuin |
| 5,072,223 | A | 12/1991 | Hethuin et al. |
| 5,191,576 | A | 3/1993 | Pommier et al. |
| 5,458,122 | A | 10/1995 | Hethuin |
| 5,469,469 | A | 11/1995 | Haines |
| 5,471,464 | A | 11/1995 | Ikeda |
| 5,561,686 | A | 10/1996 | Kobayashi et al. |
| 5,712,639 | A | 1/1998 | Hethuin |
| 5,815,497 | A | 9/1998 | Ramel |
| 5,850,390 | A | 12/1998 | Ramel |
| 5,864,577 | A | 1/1999 | Ramel |

(Continued)

FOREIGN PATENT DOCUMENTS

EP 0 667 695 A1 8/1995

(Continued)

OTHER PUBLICATIONS

International Search Report for corresponding Application No. PCT/FR 96/01562, dated Jun. 5, 1997.

(Continued)

*Primary Examiner* — John Pezzlo

(57) ABSTRACT

A method for transmitting data packets having a heading followed by a data field. The data of the field is transmitted by groups of symbols. According to the OFDM technique, subcarriers modulated by the groups are generated. A frequency modulation of a carrier signal delivered by a linear ramp generator is produced with a set of modulated subcarriers. When the signal is received, mixing with a linear ramp results in subcarriers which are separated and then demodulated for supplying data. This is useful for transmitting data packets particularly in wide band networks.

9 Claims, 3 Drawing Sheets

U.S. PATENT DOCUMENTS

| | | | | |
|---|---|---|---|---|
| 6,625,174 | B1 | 9/2003 | Hethuin et al. | |
| 2009/0316816 | A1 * | 12/2009 | Geile et al. | 375/260 |

FOREIGN PATENT DOCUMENTS

| | | | |
|---|---|---|---|
| EP | 0 655 845 | B1 | 10/2001 |
| FR | 2 737 366 | A1 | 1/1997 |
| GB | 2 145 594 | A | 3/1985 |
| GB | 2 271 693 | A | 4/1994 |
| WO | WO 93/04546 | A1 | 4/1993 |
| WO | WO 98/16043 | A1 | 4/1998 |

OTHER PUBLICATIONS

International Preliminary Examination Report issued in PCT/FR96/01562 with a completion date of Jan. 15, 1999 (English translation provided).

* cited by examiner

METHOD FOR TRANSMITTING DATA PACKETS ON CARRIER FREQUENCY WITH LINEAR VARIATION AND TRANSMITTER IMPLEMENTING THIS METHOD

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to the transmission, in particular in broadband networks, of data in packets, these packets comprising a header at a first carrier frequency, followed by an information field at a second carrier frequency, the start of transmission of the field being tied to the start of transmission of the header of the corresponding packet.

2. Discussion of the Background

It is known practice to transmit data in packets each comprising a header followed by an information field, the information afforded by the header making it possible, among other things, for the packet to be recognized and taken into account by the parties for whom it is intended.

It is known practice, utilizing a given frequency band for transmitting packets in a network, to define various transmission channels within the band and to allocate them to the transmitters of the network, either in a predetermined manner or on the basis of the transmission requirements; it turns out that such a method does not allow optimal use of the frequency band and is scarcely practical especially when a receiver is liable to receive packets on any of the channels and must therefore monitor the transmission of packets on all the channels.

It is also known practice to assign, within the band of transmission frequencies of a network, a channel to the headers; the receivers need now monitor only this channel and the information provided by the headers makes it possible to receive the fields, the latter being transmitted in the remainder of the useful band on a carrier frequency which may be constant or vary in a predetermined manner, for example in jumps, throughout the duration of the packet.

SUMMARY OF THE INVENTION

The invention lies within the realm of the transmission of the field on a carrier frequency which varies. The purpose of the invention is to improve the conditions of transmission, in particular as regards the spreading of the spectrum, the bit rate and the ease of exploitation.

This document deals with symbols. It is recalled that this involves groupings of binary information referred to as bits; these groupings may be expressed under various forms of modulation (amplitude, frequency, phase), each value of the grouping being represented by a state of the constellation in the complex plane. By way of example a grouping of m=3 bits may be expressed through a modulation with $N=2^m=2^3=8$ phase states, each phase state being situated on the unit circle at multiples of $\pi/4$. Additionally, more particularly, in the case of two-state modulation, the symbol corresponds to one bit.

By using, for the information field, a signal at a carrier frequency which varies according to a linear ramp, this purpose is achieved by modulating the said signal via several subcarriers rather than via one subcarrier, these subcarriers being, themselves, modulated by the data to be transmitted according to a technique of orthogonal frequency division multiplexing, generally referred to as the OFDM technique after its initials. It should be noted that, in what follows, the OFDM technique covers both straightforward OFDM and coded OFDM also referred to as the COFDM technique after its initials; it is recalled in this regard that, considering a binary train, in the OFDM technique the symbols are transmitted in groups of N symbols with N an integer greater than one, respectively on N subcarriers and during a time equal to the time to receive the N symbols. It is recalled that the COFDM technique is merely a variant of the OFDM technique in the sense that, in the COFDM technique, there is moreover associated a coding function which makes it possible to obtain, starting from the N input symbols, N outputs each composed of a weighting of the N input symbols.

According to the invention there is proposed a process for transmitting data in packets, these packets comprising a header at a first carrier frequency, followed by an information field at a second carrier frequency, the start of transmission of the field being tied to the start of transmission of the header of the corresponding packet, characterized in that it consists, for the transmission of the field, in using N, with N an integer greater than 1, distinct and simultaneous subcarriers, in splitting the data to be transmitted in the field into successive groups of N symbols, in assigning the N symbols respectively to the N subcarriers by OFDM multiplexing and in modulating these N subcarriers respectively by these N symbols so as to obtain a modulating signal made of the N subcarriers thus modulated, in generating a signal at the second carrier frequency varying over time according to a linear ramp, in modulating the signal at the second carrier frequency by the modulating signal, and, on reception, in mixing the signal corresponding to the information field with a ramp-like signal similar to the signal at the second carrier frequency so as to obtain a signal corresponding to the modulating signal and to extract therefrom the data of the information field.

According to the invention there is proposed a transmitter for implementing the process, characterized in that it comprises means for computing groups of symbols representative of the data to be transmitted in a field, first means of modulation by the OFDM technique for computing N, with N an integer greater than 1, subcarriers modulated by the groups so as to generate a modulating signal, a ramp generator for generating a carrier signal whose frequency varies over time according to a linear ramp and second means of modulation for receiving the signals generated by the first means of modulation and the ramp generator and for performing a modulation.

According to the invention there is also proposed a receiver for implementing the process, characterized in that it comprises a mixer with a first input for receiving a signal transmitted according to the process, a second input and an output, a ramp generator for delivering, on the second input of the mixer, a signal whose frequency varies linearly over time and, at the output of the mixer, a frequency/time operator followed by a subcarrier demodulation circuit.

BRIEF DESCRIPTION OF THE DRAWINGS

The present invention will be better understood and other characteristics will become apparent with the aid of the following description and the corresponding figures which represent.

DETAILED DESCRIPTION OF THE PREFERRED EMBODIMENTS

In the diagrams, the devices for accurate synchronization, which come within commonplace technology, have not been represented so as to make the drawings clearer and to simplify the account.

Figure 1:
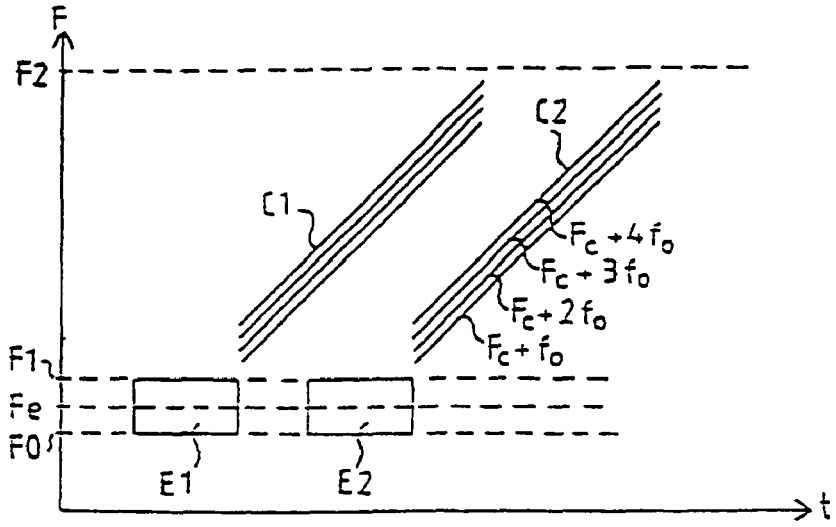
FIGS. 1 to 3, time charts relating to packets transmitted according to the invention, FIG. 4, the diagram of a transmitter according to the invention, FIG. 5, the diagram of a receiver according to the invention.

FIG. 1 is a diagrammatic chart showing how, within the realm of the invention, two successive data packets are transmitted. Each packet comprises a header E1, E2 followed by an information field C1, C2.

The header is transmitted on a fixed carrier frequency Fe and occupies a transmission channel whose limits are two frequencies F0, F1.

The information field is transmitted simultaneously in four subcarriers which modulate a carrier Fc and this carrier has a ramp-like variation, that is to say the value of its frequency is a linear function of time t; in FIG. 1 four ramps Fc+fo, Fc+2fo, Fc+3fo, Fc+4fo constitute a symbolic representation of each of the information fields C1 and C2.

The information field thus occupies a frequency channel of constant width, which moves continuously over time between the value F1 and a value which, for the longest packets, is at most equal to F2, the band F0-F2 being the frequency band allocated to the network in which the relevant packets are exchanged.

It should be noted that in the various charts of this document the proportions between the diverse time intervals and between the diverse frequency intervals are given merely by way of examples since they depend on the applications; moreover, the proportions are not complied with between the various charts.

The transmission, in the network, of the data of the information field is carried out in groups; the modulation used on each subcarrier can be of various types; two-state phase modulations, referred to as DPSK after the initials standing for Differential Phase-Shift Keying, are the simplest and most economical for transmitting packets of this type; modulations with more than two phase states, in particular with 8 phase states, referred to as D8PSK, make it possible to attain higher bit rates but at the cost of inferior immunity to noise. In the case, for example, of four subcarriers for the field, the groups are made up of four symbols which reduce to four bits in the case of a modulation with two phase states. These groups are transmitted by the straightforward OFDM technique or the coded OFDM, that is to say the COFDM, technique, depending on the way in which it is planned to operate the network.

Thus, the overall bit rate is shared between the subcarriers and may easily be increased or decreased by increasing or decreasing the number of subcarriers.

By way of example use has been made of a set of 16 subcarriers over a total instantaneous frequency band of 8 MHz, each subcarrier making it possible to transmit around 250 kbaud/s, i.e. in the case of QPSK modulation, a bit rate of 500 kb/s per subcarrier and an overall bit rate of 8 Mb/s. Each symbol time therefore lasts 2 μs. With a ramp which lasts around 500 μs for a total band of around 250 MHz the variation in frequency between the start and the end of a symbol time is then 1 MHz.

Figure 2:
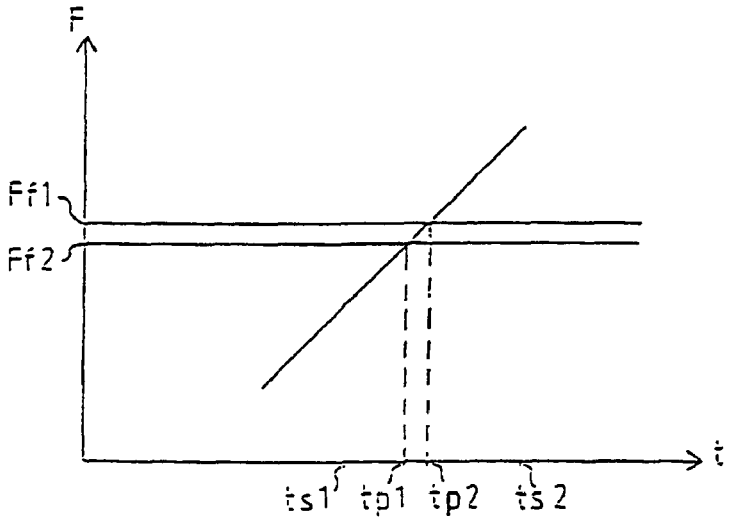

FIG. 2 is intended to show how, on account of its makeup, the information field is scarcely sensitive to fading. This is because, if a frequency band Ff1-Ff2 is blocked by selective fading, a symbol of duration ts2-ts1, transmitted by modulation of a frequency ramp, is affected by this fading only when passing through the band Ff1-Ff2, that is to say only during the time tp2-tp1 and this time is inversely proportional to the slope of the ramp used. It is thus apparent that the problem of selective fading amounts to a problem of temporal fading, the effects of which are then reduced by the modulation by the OFDM technique which makes it possible to lengthen the duration of the symbol time, for equivalent bit rate, with respect to conventional transmission on a single subcarrier.

Figure 3:
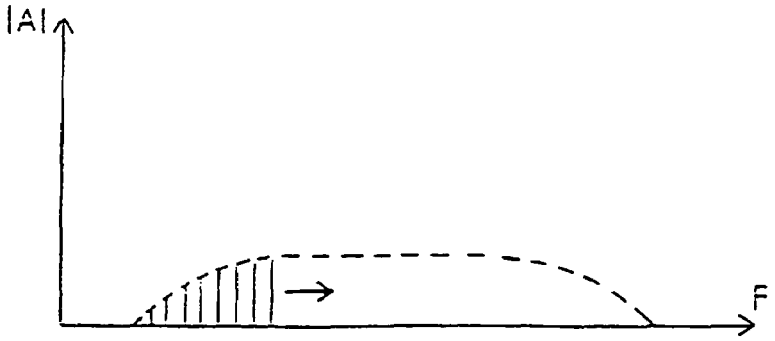

It should also be noted that, because the transmission energy is distributed not over a single subcarrier but over several and because the carrier is modulated by a linear ramp, the transmission spectrum of the information fields is spread and undergoes a translation corresponding to the modulation of the frequency ramp. This is illustrated by FIG. 3 which represents, at a given instant, the amplitude |A| of the main spectral lines corresponding to the subcarriers, as a function of transmission frequencies; as the carrier frequency varies between its two extreme values, the spectrum, whose envelope is depicted by a broken curved line, undergoes a shift depicted by a horizontal arrow in FIG. 3. The case represented in this figure is that of eight subcarriers.

Figure 4:
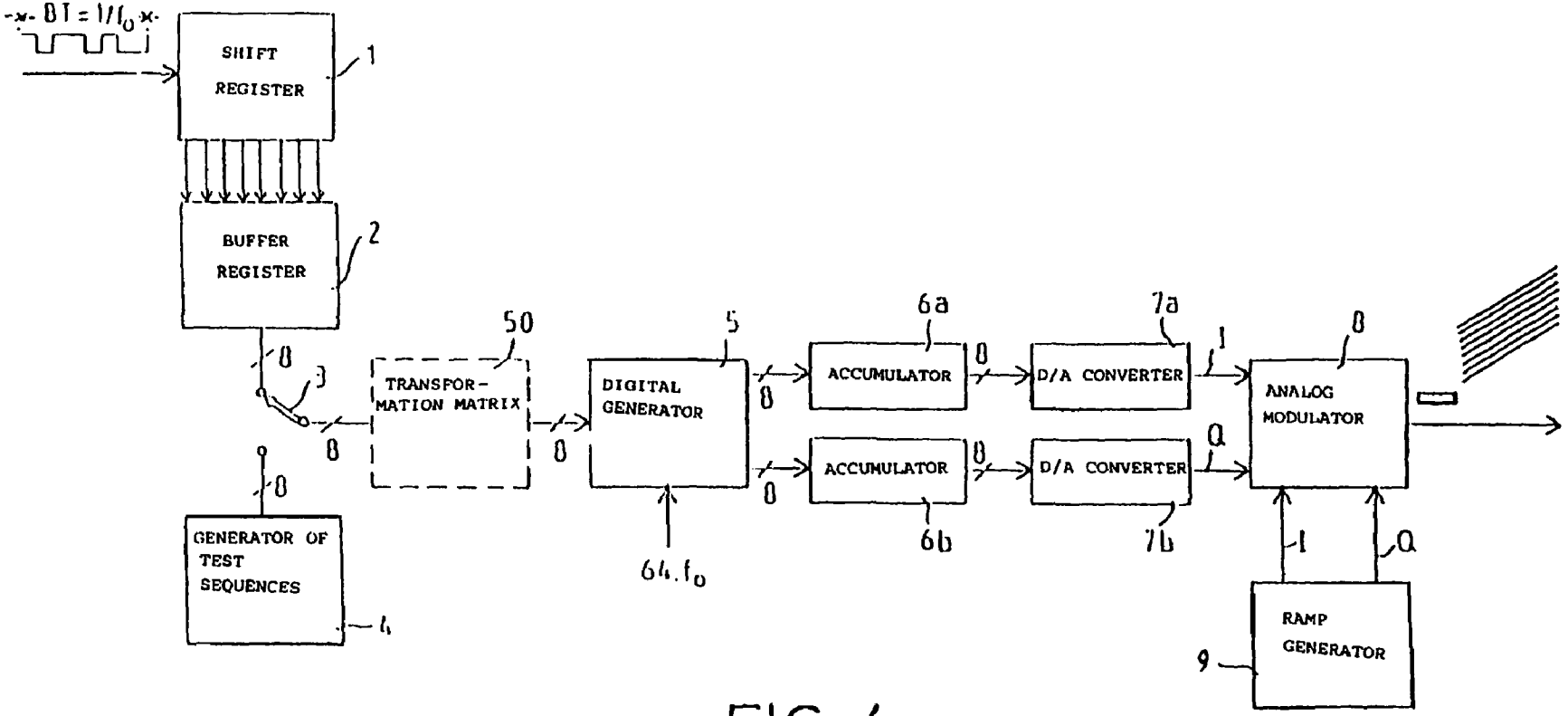

FIG. 4 is the diagram of a transmitter for implementing the process for transmitting packets which has just been described with the aid of FIGS. 1 to 3. The example described relates to transmission on eight subcarriers by the COFDM or straightforward OFDM technique; in the diagram, a circuit 50, drawn dashed, represents the coding function which makes it possible to pass from the OFDM technique to the COFDM technique.

The information to be transmitted is applied to the input of a shift register 1 whose eight outputs are linked to the input of a buffer register 2. This information consists of symbols delivered at the rate of 8fo which are grouped together into successive groups of 8 symbols each, by virtue of the shift register/buffer register assembly; the duration of a group is therefore 8T=8/8fo=1/fo.

The contents of the register 2 are applied to the first terminals of an electronic switch 3 which, if it could be embodied in a mechanical version, would be an eight-wafer two-position switch.

In what follows it will firstly be considered that the switch 3 is connected directly to the eight inputs of a digital generator, 5, of eight modulated subcarriers, of respective frequencies fo, 2fo, 3fo, . . . , 8fo; these ratios between the frequency values are given by way of non-limiting example. In the case of the example described, where an oversampling by factor 8 of the fastest subcarrier is performed, the generator 5 comprises a trigonometric table sampled at the frequency 64.fo in angular gaps of $2\pi/64$ for the frequency fo, of $2\pi.2/64$ for the frequency 2fo, of $2\pi.3/64$ for the frequency 3fo, . . . , of $2\pi.8/64$ for the frequency 8fo. In the example described each subcarrier is assigned a multiplicative coefficient +1 or −1, for two-state phase modulation, depending on whether the bit corresponding to the relevant subcarrier has the value 1 or 0. The sampling is performed sine-wise and cosine-wise so as to generate two quadrature components for each subcarrier. The eight components I and Q are transmitted, respectively to two accumulators 6a, 6b in which the eight components of like temporal index are summed to yield, as accumulator output, a binary number; in the example described this binary number is made up of eight bits. The accumulators 6a, 6b are linked respectively to two digital/analog converters 7a, 7b working at the rate of 64.fo and furnished with low-pass output filters.

An analog I and Q modulator 8 receives the signals from the converters 7a, 7b on two first inputs and the signals I and Q from a digital sawtooth generator with analog outputs on two second inputs. The modulator 8 thus receives two modulation signals of the form sin a, cos b on its first inputs and two carrier signals of the form sin a, cos a on its second inputs; it carries out the operation cos a.cos b−sin a.sin b and therefore outputs a signal of the form cos(a+b), that is to say a carrier modulated by eight subcarriers. The output signal from the modulator 8 is next amplified, in a linear amplifying chain (not represented), before being transmitted.

The switch 3, according to FIG. 4, makes it possible to insert groups of test data between the groups of information data originating from the register 2. These groups of test data have a configuration which is known to the receivers for which the data packets are intended; they make it possible, in a conventional manner, to adjust the receivers so as to take account, in particular, of the pulse response engendered by the diverse multipaths of the signal between a receiver and a transmitter.

In FIG. 4 a rectangle has been drawn dashed; this rectangle represents a transformation matrix 50 which is inserted between the switch 3 and the subcarrier generator 5 when it is desired that the transmission be performed not by the straightforward OFDM technique as was considered with the transmitter as described hitherto, but by the COFDM technique; the matrix 50 transforms the binary data of the input data group into a set of output signals with interdependent polynomials, so as to reduce, in a conventional manner, the transmission errors.

In the foregoing it was considered that the symbols of the groups represented 0 or 1 bits but, of course, they may also represent values of modulation constellations such as modulations of phase, of frequency or of phase, with N states; and the symbols then represent complex amplitude and phase values, it being possible for each symbol to be written in the form $A_k e^{j\phi k}$ where $A_k$ represents an amplitude, e is Euler's number, j is the imaginary unit, $\phi k$ is an angle and k denotes the symbol with $0 \leqq k \leqq N-1$, if N denotes the number of modulation states.

In the transmitter according to FIG. 4 each subcarrier is constructed temporally, sample after sample, by taking account of the binary information to be transmitted; this involves direct generation of the subcarriers. A conventional alternative consists in producing the transmitter in such a way as to compute the theoretical spectrum with the modulated subcarriers and to perform an inverse discrete Fourier transform, such as an Inverse Fast Fourier Transform or $FFT^{-1}$, so as to generate temporal-signals, each of which is valid over the duration of a group of N symbols.

Figure 5:
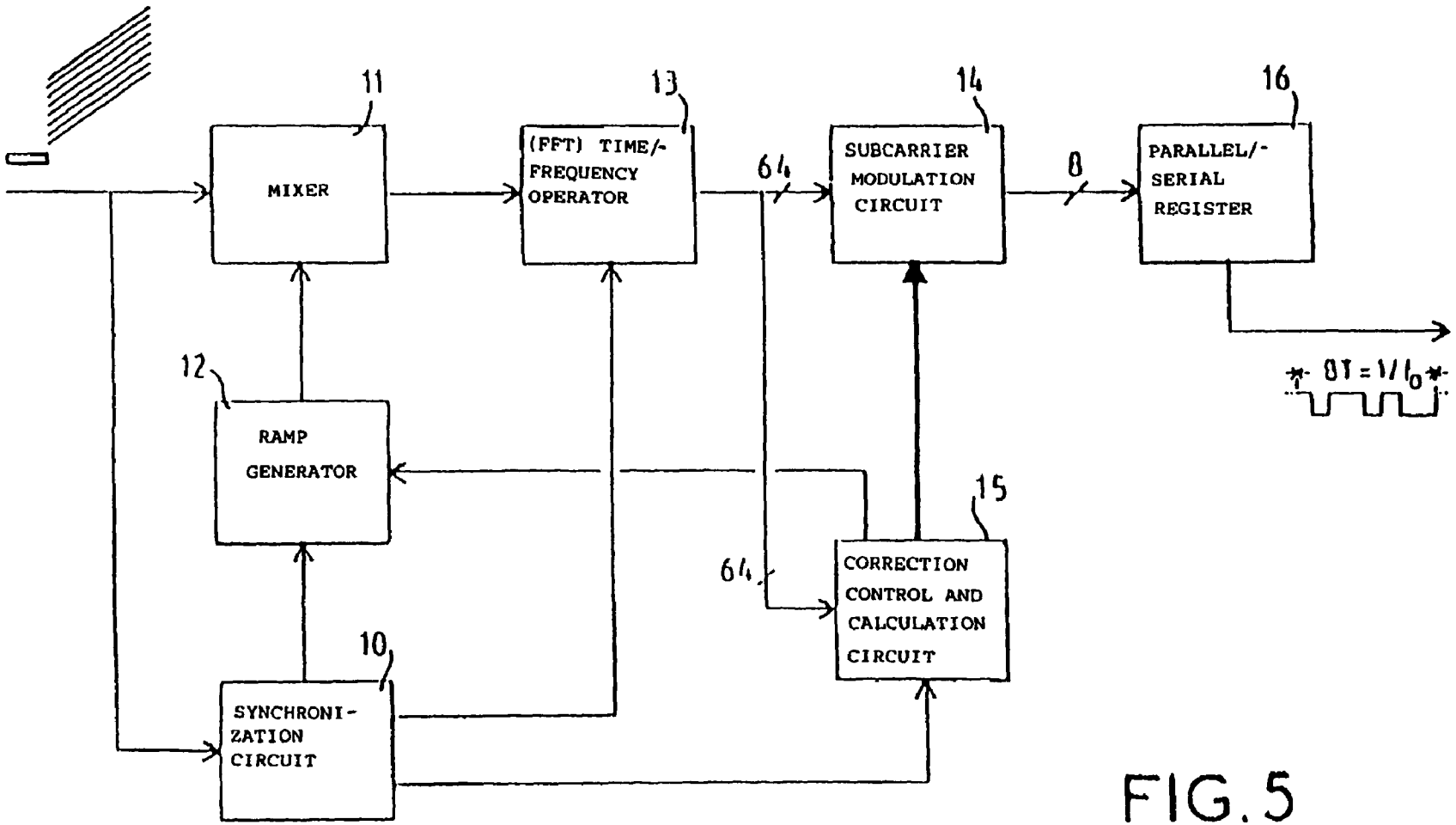

FIG. 5 is the diagram of a receiver for receiving packets transmitted by the transmitter according to FIG. 4.

In what follows, with regard to everything which is conventional in the transmission of packets consisting of a header and an information field, in the technique of echo discrimination and in that of transmission error correction, the explanations will be given without being burdened by the details of embodiment which are within the scope of the person skilled in the art so as to highlight better that which, in the receiver, is specific to the invention.

The signal received by the receiver according to FIG. 5 is analysed continuously by a synchronization circuit 10. The circuit 10 comprises a clock which is synchronized with the headers of the packets; to do this, when a first correlation peak exceeds the detection threshold, the analysis of the subsequent peaks, during a given time interval, preferably a symbol time, makes it possible to sharpen the synchronization of the clock and thus to give an accurate time reference for receiving the information field. When this synchronization is achieved, the signal received is mixed, in a mixer 11, with the output signal from a ramp generator 12 which supplies, on a single output, an analog signal with the same slope and the same frequencies as the output signals from the slope generator 9 of the transmitter according to FIG. 4; the ramp generator 12 is triggered coherently with the synchronization pip obtained in the synchronization circuit 10. The mixer 11 comprises an output filter for eliminating the "sum frequency" terms.

A time-frequency operator 13 receives the signals from the mixer 11; this involves, in the example described, an operator of the Fourier transform type, such as the Fast Fourier Transform or FFT. The operator 13, also coherently with the synchronization pips computed by the synchronization circuit 10, supplies, in the example described, a set of 64 analysis signals making it possible to extract the information carried by the eight subcarriers of the information field signal. These 64 analysis signals are supplied either to a circuit 15 for calculating and controlling pulse response correction and frequency gaps when the data transmitted are test data, or to a circuit 14 for demodulating the subcarriers when the data transmitted are information data. The circuit 15 supplies pulse response correction signals to the circuit 14 and frequency offset correction signals to the ramp generator 12.

The next three paragraphs relate to remarks regarding the faults which may affect the transmission of data in a network implementing the transmission process just described with, by way of example, a transmitter according to FIG. 4 and a receiver according to FIG. 5.

The multipaths between a transmitter and a receiver, in so far as the differences between their respective durations are short with respect to the duration of a symbol, are not troublesome precisely because the OFDM technique is employed. It is however possible to estimate these multiple paths so as either to choose, between the signals corresponding to the various paths, the one possessing the most energy, or to recombine all or some of the signals relating to the multiple paths so as to increase the energy of the demodulated signal and thus improve the robustness of the process. Here this involves estimating the pulse response of the channel, the components being used according to their amplitude and their phase to retrieve the original signal; strictly speaking, this estimate must be remade along the whole ramp since the value of the carrier frequency changes continually but in practice it is sufficient to make this estimate over a few regularly spaced portions of the frequency ramp. To make this estimate it is possible, for example, to use test groups made up of 1 out of all the subcarriers and to determine, through a frequency analysis of the output signal from the mixer 11, the phase and the amplitude of each of the components of the spectrum, for each subcarrier.

It is also possible to estimate and to correct the frequency gap between the transmitter and the receiver; this frequency gap is due to the drifting which exists between the local oscillators of the transmitter and of the receiver, to the differences imparted by the Doppler effect, to the residual frequencies generated by imperfect synchronization with the header; each of the subcarriers is affected by the same frequency drift. To determine this drift so that it can be taken into account, it is possible, for example, to transmit at the start of the ramp or regularly within the ramp, a group of known symbols such as a series of is so as to obtain a set of pure subcarriers which aids the detection of the frequency drift with the help of a spectrum analyser.

The invention is not limited to the description just provided and extends more generally to all variants within the scope of the person skilled in the art in particular as regards the circuits for implementing the process, the frequencies used, the number of subcarriers of the information fields; it is obvious, moreover, that the header may itself also be transmitted with the help not of a single but of several subcarriers and that the values of the frequencies of these subcarriers need not be regularly distributed.

What is claimed is:

1. A process for transmitting data in packets, [the packets comprising a header at a first carrier frequency, followed by an information field at a second carrier frequency, a start of transmission of the information field being tied to a start of transmission of the header of the corresponding packet,] comprising:

*obtaining data packets to be transmitted the packets comprising a header to be transmitted at a first carrier frequency, followed by an information field to be transmitted at a second carrier frequency, wherein a start of transmission of the information field is tied to a start of transmission of the header of the corresponding packet, and wherein transmission at the second carrier frequency starts with the information field;*

[using] *providing* N distinct [and simultaneous] subcarriers for *concurrent* transmission of *data* in the information field, where N is an integer greater than 1;

splitting the data to be transmitted in the information field into successive groups of [N] *M* symbols;

assigning the [N symbols] *M symbols* respectively to the N subcarriers by OFDM multiplexing;

modulating the N subcarriers respectively by the [N symbols] *M symbols* thereby obtaining a modulating signal made of the N subcarriers;

generating a *transmit* signal at the second carrier frequency varying over time according to a linear ramp for optimizing bandwidth use;

modulating the *transmit* signal at the second carrier frequency by the modulating signal; and mixing the *transmit* signal, upon reception, corresponding to the information field with a ramp signal corresponding to the *transmit* signal at the second carrier frequency to obtain a *received* signal corresponding to the modulating signal and to extract from the *received* signal data of the information field.

2. The process according to claim 1, wherein the modulating the N subcarriers comprises:

constructing from a table of samples having values representative of the N subcarriers modulated by the data of each of said successive groups, thereby directly generating the subcarriers;

summing samples of like temporal index; and converting a result of summation of the samples from digital to analog, thereby obtaining a modulating signal.

3. A transmitter for transmitting data in packets, the packets comprising a header *to be transmitted* at a first carrier frequency, followed by an information field *to be transmitted* at a second carrier frequency, a start of transmission of the information field [being] *is* tied to a start of transmission of the header of the corresponding packet, *and wherein transmission at the second carrier frequency starts with the information field,* wherein the transmitting comprises [using] *providing* N distinct [and simultaneous] subcarriers for *concurrent* transmission *of data* in the information field, where N is an integer greater than 1, splitting the data to be transmitted in the information field into successive groups of [N symbols] *M symbols*, assigning the [N symbols] *M symbols* respectively to the N subcarriers by OFDM multiplexing, modulating the N subcarriers respectively by the [N symbols] *M symbols* thereby obtaining a modulating signal made of the N subcarriers, generating a signal at the second carrier frequency varying over time according to a linear ramp, modulating the signal at the second carrier frequency by the modulating signal, and mixing the signal, upon reception, corresponding to the information field with a ramp signal corresponding to the signal at the second carrier frequency to obtain a signal corresponding to the modulating signal and to extract from the signal data of the information field, the transmitter comprising:

a computing device, configured to compute groups of symbols representative of data to be transmitted in a field;

a first modulator, configured to generate [a] *the* modulating signal by OFDM for the N subcarriers;

a ramp generator configured to generate a carrier signal, wherein the carrier signal has a frequency variant over time according to [a] *the* linear ramp for optimizing bandwidth use; and second modulator, configured to receive signals generated by the first modulator and the ramp generator.

4. The transmitter according to claim 3, wherein the first modulator comprises:

a digital generator of modulated subcarriers;

a summation device; and a digital to analog converter, wherein the digital generator, the summation device, and the digital to analog converter are arranged in series.

5. A receiver for transmitting data in packets, the packets comprising a header *to be transmitted* at a first carrier frequency, followed by an information field *to be transmitted* at a second carrier frequency, *wherein* a start of transmission of the information field [being] *is* tied to a start of transmission of the header of the corresponding packet, *and wherein transmission at the second carrier frequency starts with the information field,* wherein the transmitting comprises [using] *providing* N distinct [and simultaneous] subcarriers for *concurrent* transmission *of data* in the information field, where N is an integer greater than 1, splitting the data to be transmitted in the information field into successive groups of [N symbols] *M symbols*, assigning the [N symbols] *M symbols* respectively to the N subcarriers by OFDM multiplexing, modulating the N subcarriers respectively by the [N symbols] *M symbols* thereby obtaining a modulating signal made of the N subcarriers, generating a signal at the second carrier frequency varying over time according to a linear ramp, modulating the signal at the second carrier frequency by the modulating signal, and mixing the signal, upon reception, corresponding to the information field with a ramp signal corresponding to the signal at the second carrier frequency to obtain a signal corresponding to the modulating signal and to extract from the signal data of the information field, the receiver comprising:

a mixer, comprising:

a first input for receiving a signal;

a second input; and an output;

a ramp generator, wherein the ramp generator is configured to deliver a signal having a frequency variant over time according to [a] *the* linear ramp, for optimizing bandwidth use, to the second output of the mixer;

a frequency time/operator; and a subcarrier demodulation circuit.

*6. A process for transmitting data, the process comprising:*

*modulating two or more subcarriers by the data to be transmitted using an OFDM technique a to obtain a modulating signal made up of the two or more subcarriers, the data to be transmitted comprising data packets, the packets comprising a header to be transmitted at a first carrier frequency, followed by an information field to be transmitted at a second carrier frequency, wherein a start of transmission of the information field is tied to a start of transmission of the header of the cor-*

*responding packet, and wherein transmission at the second carrier frequency starts with the information field;*

*generating a carrier signal at a frequency varying over time according to a linear ramp for optimizing bandwidth use, and*

*modulating the carrier signal by the modulating signal.*

*7. The process of claim 6, wherein modulating two or more subcarriers by the data to be transmitted using an OFDM technique comprises:*

*using N subcarriers for transmitting the data, where N is an integer greater than 1;*

*splitting the data to be transmitted into successive groups of M symbols;*

*assigning the M symbols respectively to the N subcarriers by OFDM; and*

*modulating the N subcarriers respectively by the M symbols thereby obtaining a modulating signal made of the N subcarriers.*

*8. The process of claim 7, wherein modulating the N subcarriers respectively by the N symbols further comprises:*

*constructing from a table of samples having values representative of the N subcarriers modulated by the data of each said successive groups, thereby directly generating the subcarriers;*

*summing samples of like temporal index; and*

*converting a result of summation of the samples from digital to analog, thereby obtaining a modulating signal.*

*9. A transmitter for transmitting data, the transmitter comprising:*

*a first modulator configured to generate a modulating signal for two or more subcarriers using the data to be transmitted and an OFDM technique, the data to be transmitted comprising data packets the packets comprising a header to be transmitted at a first carrier frequency, followed by an information field to be transmitted at a second carrier frequency, wherein a start of transmission of the information field is tied to a start of transmission of the header of the corresponding packet, and wherein transmission at the second carrier frequency starts with the information field;*

*a ramp generator configured to generate a carrier signal, wherein the carrier signal has a frequency variant over time according to a linear ramp for optimizing bandwidth use; and*

*a second modulator configured to modulate the carrier signal by the modulating signal for the two or more subcarriers.*

* * * * *

UNITED STATES PATENT AND TRADEMARK OFFICE

CERTIFICATE OF CORRECTION

PATENT NO. : RE43,128 E
APPLICATION NO. : 11/234820
DATED : January 24, 2012
INVENTOR(S) : Hethuin et al.

It is certified that error appears in the above-identified patent and that said Letters Patent is hereby corrected as shown below:

Title page, item (54), under "Title", in Column 1, Lines 3-4, and in Column 1, Lines 3-4 (in the Title), delete "TRANSMITTER IMPLEMENTING" and insert -- TRANSMITTER *AND RECEIVER* IMPLEMENTING --.

Column 7, line 17, in Claim 1, delete "of *data*" and insert -- *of data* --.

Column 7, line 49, in Claim 3, delete "a" and insert -- *wherein* a --.

Column 8, line 60, in Claim 6, delete "a *to obtain*" and insert -- *to obtain* --.

Column 9, line 21, in Claim 8, delete "*N symbols*" and insert -- *M symbols* --.

Column 9, line 24, in Claim 8, delete "*each said*" and insert -- *each of said* --.

Column 10, line 9, in Claim 9, delete "*packets the packets*" and insert -- *packets, the packets* --.

Signed and Sealed this
Twenty-fifth Day of September, 2012

David J. Kappos

David J. Kappos
*Director of the United States Patent and Trademark Office*